Jan. 5, 1926. 1,568,289
L. MELANOWSKI
POWER TRANSMITTING MECHANISM
Filed April 7, 1919 4 Sheets-Sheet 1
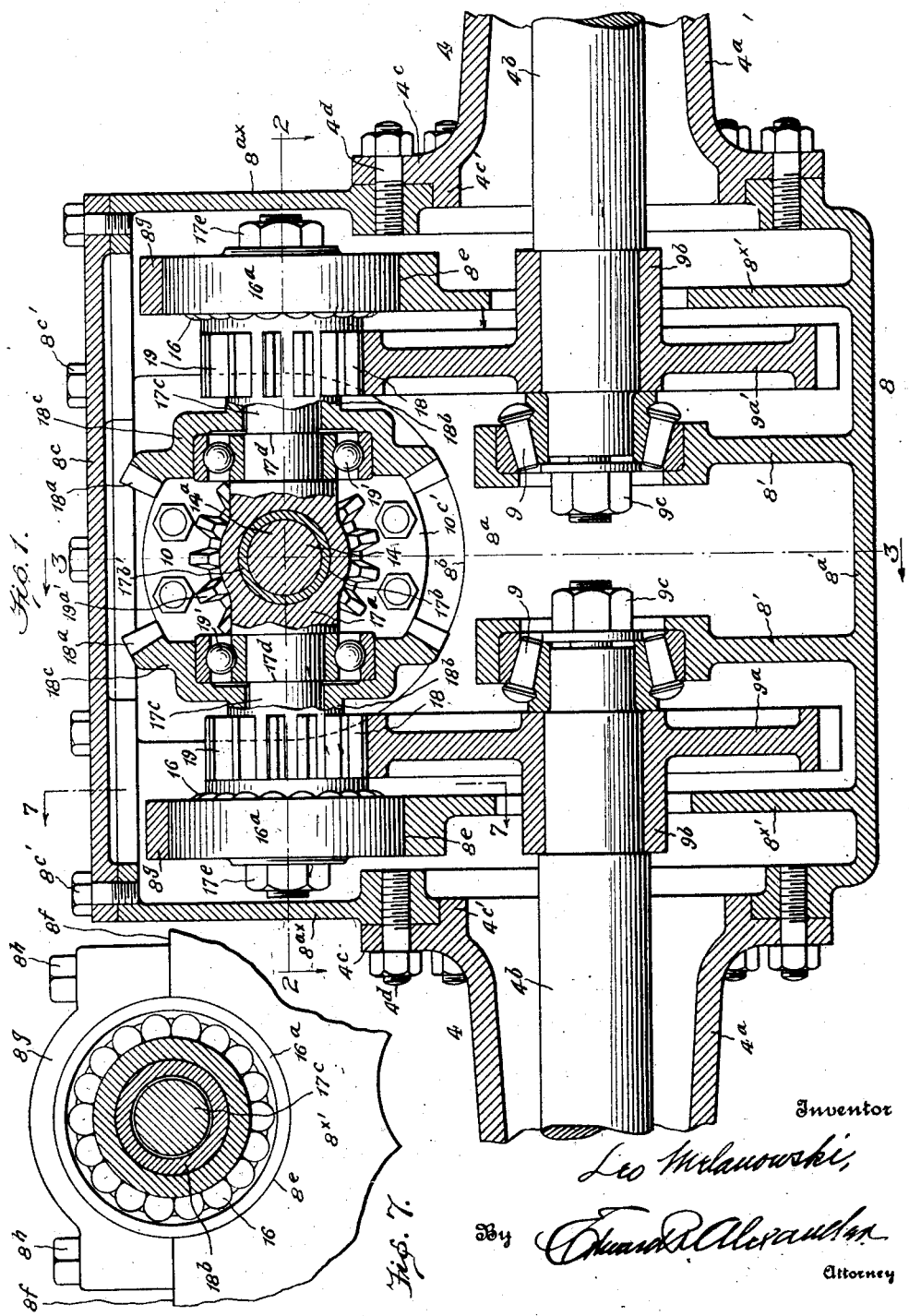

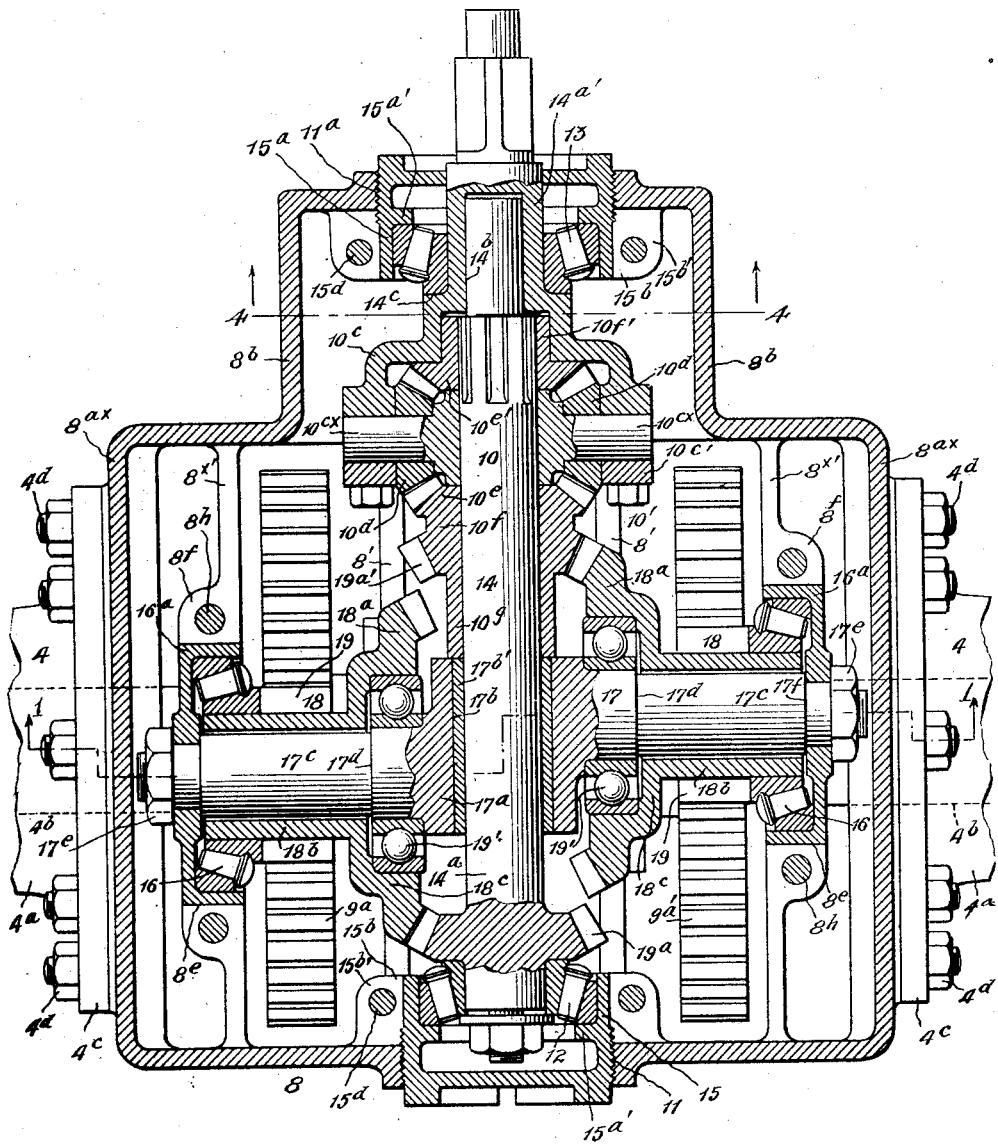

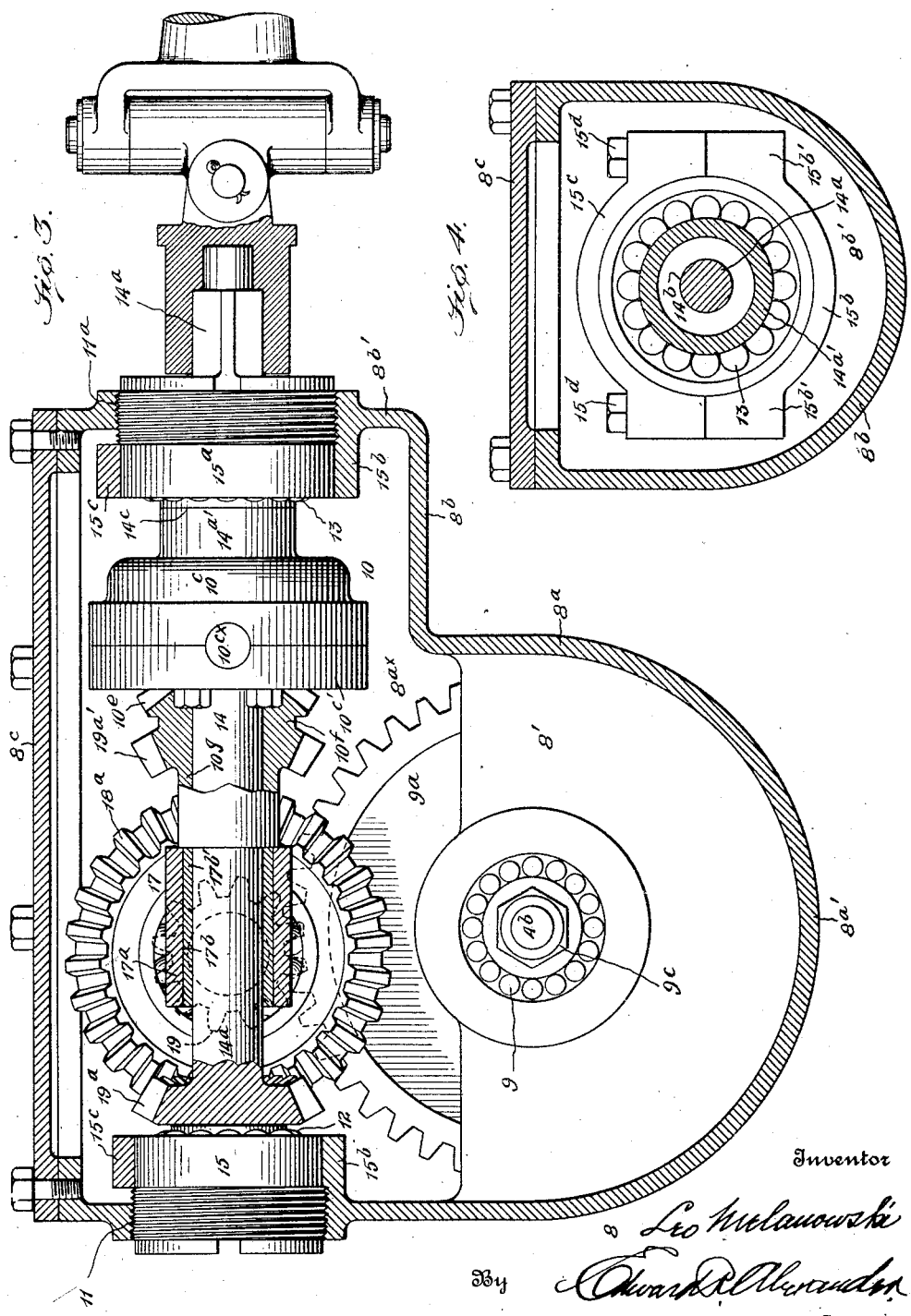

Jan. 5, 1926. 1,568,289
L. MELANOWSKI
POWER TRANSMITTING MECHANISM
Filed April 7, 1919  4 Sheets-Sheet 4
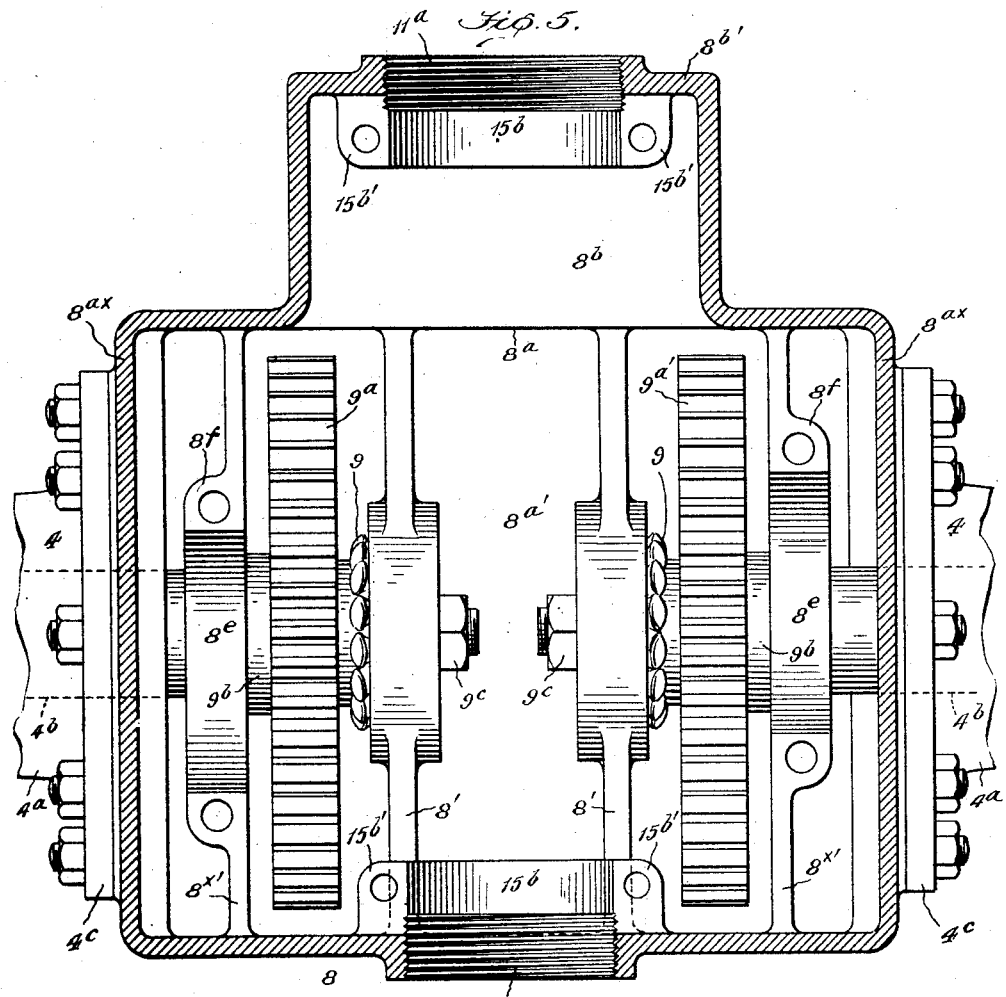
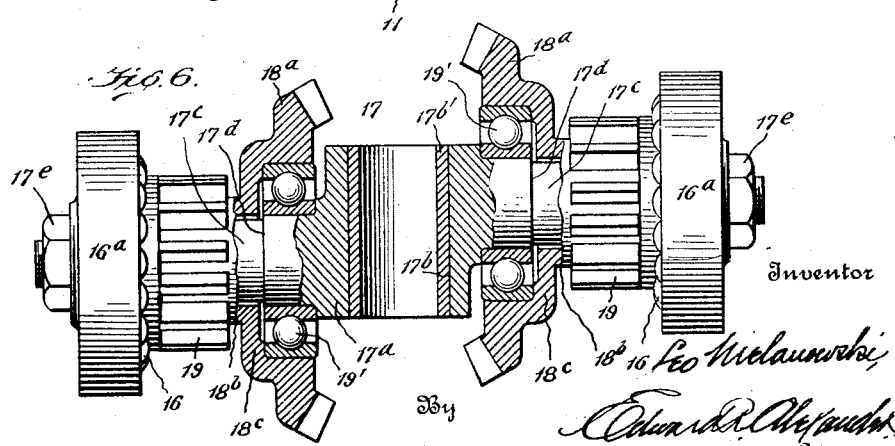

Patented Jan. 5, 1926.

1,568,289

UNITED STATES PATENT OFFICE.

LEO MELANOWSKI, OF CLEVELAND, OHIO, ASSIGNOR TO THE CITIZENS SAVINGS AND TRUST COMPANY, OPERATING TRUSTEE, OF CLEVELAND, OHIO, A CORPORATION OF OHIO.

POWER-TRANSMITTING MECHANISM.

Application filed April 7, 1919. Serial No. 288,013.

*To all whom it may concern:*

Be it known that I, LEO MELANOWSKI, a citizen of the Republic of France, residing at Cleveland, in the county of Cuyahoga and State of Ohio, have invented certain new and useful Improvements in and relating to Power-Transmitting Mechanism, of which the following is a specification.

This invention relates to motor vehicles, more particularly to the power transmitting mechanism therefor.

One object of the invention is to provide an improved power transmitting mechanism capable of transmitting the power of the engine to the drive wheel or wheels of the vehicle effectively and economically.

Another object of the invention is to provide a power transmitting mechanism in which the proper speed reduction may be secured between the propeller shaft and the traction wheel or wheels to propel the vehicle positively and economically.

A further object of the invention is to simplify, in construction and arrangement, the elements constituting the power transmitting mechanism.

Another object of the invention is to provide mechanism of this character in which the differential elements and proper speed reducing elements are correlated and combined to transmit the power of the propeller shaft with minimum friction losses.

Another object of the invention is to so construct and correlate the elements constituting differential and speed reducing elements and the housing members therefor that adjustments, assembly and disassembly of such elements and members may be readily made.

A further object of the invention is to provide for the ready assembly and disassembly of the differential mechanism as a unit.

Other objects of the invention will be apparent to those skilled in the art to which my invention relates from the following description, and the accompanying drawings.

For the purpose of illustration, I have, in the accompanying drawings shown and herein described one form of power transmitting mechanism embodying my invention.

In the drawings, Fig. 1 is a vertical sectional view on the line 1—1 of Fig. 2, showing a power transmitting mechanism embodying my invention.

Fig. 2 is a section on the line 2—2 of Fig. 1.

Fig. 3 is a section on the line 3—3 of Fig. 1.

Fig. 4 is a section on the line 4—4 of Fig. 2.

Fig. 5 is a section on the line 2—2 of Fig. 1 with the differential mechanism and compound shaft removed.

Fig. 6 is a fragmentary sectional view illustrating details of construction.

Fig. 7 is a detail section on the line 7—7 of Fig. 1.

In the drawings, 4 indicates as an entirety that axle, preferably the rear axle, of a vehicle which is driven by power, such for example, by an internal combustion motor (not shown). The shaft of the motor is connected to a propeller shaft which, in turn, in the preferred embodiment of my invention, is connected to the rear axle 4 and transmits its power thereto through the transmitting elements hereinafter described. The latter are preferably constructed and correlated to permit all sections of the propeller shaft to be arranged, when the chassis is disposed in a normal position relative to the axes of the vehicle axles, in axial alignment with the axis of the motor crank shaft, whereby the latter and the propeller shaft sections or elements may transmit the power of the motor with minimum friction losses.

The rear axle 4 preferably comprises a pair of tubular members 4ª, each of which encloses a driven axle section 4ᵇ. Each drive axle section is connected in any suitable manner to the adjacent rear wheel (not shown). At their inner ends the tubular members 4ª are flared or enlarged, as shown at 4ᶜ, to form, in part, the end walls of a housing or casing 8. Upon its inner wall, each tubular member 4ª is preferably provided with an annular rib 4ᶜ' which fits the inner wall of the opening in the casing 8 to form a substantially liquid tight joint. The flared end walls 4ᶜ are detachably secured to the casing 8 by any suitable means, such as bolts 4ᵈ. 8' indicates a pair of plates or standards preferably formed integrally with the walls of the housing 8.

Each plate 8′ is formed with an annular seat to receive and support an anti-friction bearing 9 for the inner end of the adjacent driven axle section 4ᵇ. The bearings 9 are preferably of the tapered roller type and serve to take end thrusts. The inner race of the bearing fits against a shoulder formed by reducing the free end of the axle section 4ᵇ, and is held thereon by a nut 9ᶜ.

9ª, 9ª′, indicate gears fixed to the inner ends of the driven axle sections 4ᵇ. Each gear may comprise a hub 9ᵇ fitting over and keyed in any suitable manner to the reduced end of the adjacent axle section and held thereon by any well known means, but preferably by the nut 9ᶜ operating through the inner bearing race. The gears are preferably provided with spur teeth.

The housing 8 preferably compriseses a front wall 8ª, a bottom wall 8ª′ and side walls 8ᵃˣ to which the flared ends 4ᶜ of the tubular members are secured, as already described. At 8ᵇ the housing 8 is extended forward or enlarged to entirely house the power transmitting and speed reducing mechanism, including the differential, indicated as an entirety at 10. The upper side of the housing 8 and extension chamber 8ᵇ are preferably open and this opening is closed by a cover or plate 8ᶜ. The cover 8ᶜ may be removably secured to the side walls of the housing by cap screws 8ᶜ′, the engagement between the housing walls and the cover being such as to provide a substantially liquid tight joint. By the simple act of removing the cover 8ᶜ, access may be had to all the elements within the housing for adjustment, inspection and lubrication purposes.

11 indicates an opening formed in the rear portion of the wall 8ª and 11ª indicates an opening formed in the front wall 8ᵇ′ of the extension 8ᵇ. These openings are so aligned relatively to each other that a straight line passing through their centers coincides, when the chassis is in normal position, as already set forth, with the longitudinal axis of the propeller shaft and the shaft of the motor. The purpose of these openings 11, 11ª, is to support mountings for bearings, indicated at 12 and 13, and to permit ready access thereto and removal and adjustment thereof, whereby the power transmitting and speed reducing mechanism can be inspected, adjusted, removed and replaced in a simple and unitary manner. The bearings 12 and 13 preferably comprise anti-friction elements of the tapered roller type, adapted and arranged to take thrusts in either direction endwise of the propeller shaft. 15, 15ª, indicate supports or mountings for the bearings 12, 13, respectively. Each support is provided with an internal flange or rib 15ª′ to form a seat for the outer race of the adjacent bearing. Each support has screw thread connection with the inner wall of the adjacent opening, whereby it can be rotated to provide adjustment for the adjacent bearing. The supports 15, 15ª, may be provided on their outer faces with walls or lugs adapted to receive a suitable tool to facilitate their removal.

I preferably provide means for clamping each support in its adjusted position. These means may comprise an inwardly extending wall 15ᵇ having wings 15ᵇ′, formed integrally with the adjacent housing wall 8ª or 8ᵇ′, a yoke piece 15ᶜ which rests upon the wings 15ᵇ′ and bolts 15ᵈ for securing the yoke piece to the wings. As shown in Fig. 4, the walls 15ᵇ and yoke piece 15ᶜ are each substantially semi-circular in shape and are adapted to receive between them the the inner end of the adjacent support 15 or 15ª. When the yoke piece is secured by the bolts 15ᵈ to the wings 15ᵇ′, it serves to clamp the support between these elements and lock it against turning.

Of the speed reducing and power transmitting mechanism 10, 14 indicates a compound shaft mounted in the bearings 12, 13. The shaft 14 consists of two sections 14ª, 14ª′, the latter of which is connected in any well known manner to, and—in the preferred embodiment of my invention—constitutes one element of the propeller shaft (not shown). The shaft section 14ª′ is enlarged to form a casing or support 10ᶜ for the differential 10′. At 14ᵇ the shaft section 14ª′ is formed with a socket to rotatably receive and support the inner end of shaft section 14ª; and at 14ᶜ the shaft section 14ª′ is provided with a shoulder against which the inner race of the bearing 13 abuts. 10ᶜ′ indicates an annular member which is removably fixed to the enlarged or outer end of the casing 10ᶜ. Between the opposing walls of the casing 10ᶜ and annular member 10ᶜ′ are formed co-operating recesses in which are mounted studs 10ᶜˣ carrying bevel pinions 10ᵈ. At their inner ends the studs 10ᶜˣ may be integrally connected to a collar surrounding the shaft 14ª. 10ᵉ, 10ᵉ′, indicate differential gears having hubs 10ᶠ, 10ᶠ′, respectively. The gears 10ᵉ, 10ᵉ′, mesh with the pinions 10ᵈ and are rotated thereby in the usual manner. As shown in Fig. 2, the shaft 14ª extends through the differential gears 10ᵉ, 10ᵉ′, forming an axle upon which the hub 10ᶠ of the gear 10ᵉ may rotate when differential movement of the gears 10ᵉ, 10ᵉ′, takes place. The shaft 14ª is connected in any well known manner at its inner end to the hub 10ᶠ′ of the gear 10ᵉ′ to transmit the power to one of the driven axle sections 4ᵇ. The differential casing 10ᶜ is preferably provided with an annular recess to rotatably receive the hub 10ᶠ′, it thereby operating to transmit the thrusts upon the gear 10$^{e\prime}$ to the bearing 13 and co-operating with other elements of the mechanism to maintain them in proper correlation.

8$^{x\prime}$ indicates a pair of supplemental standards, preferably formed integrally with the walls of the casing 8. As shown in Figs. 1, 2 and 5, each standard 8$^{x\prime}$ is arranged substantially midway between one of the standards 8' and the adjacent side wall 8$^{ax}$. By this construction, the gears 9$^a$, 9$^{a\prime}$, are arranged between the supplemental standards 8$^{x\prime}$ for purposes to be later described. At their upper ends, each supplemental standard 8$^{x\prime}$ is flanged and recessed to form a semi-circular seat 8$^e$ and an abutment 8$^f$ for a semi-circular yoke piece 8$^g$, which co-operates with the seat 8$^e$ to support between them a bearing 16. The yoke piece 8$^g$ may be secured to the abutment 8$^f$ by suitable bolts 8$^h$ and thereby fixedly support the adjacent bearing 16. The bearings 16 may be of the anti-friction type, having tapered rollers capable of taking end thrusts. The outer race of each bearing may be seated in a cup 16$^a$ which is arranged to be supported in the adjacent seat 8$^e$.

17 indicates a transversely arranged supporting member. It preferably comprises a central member 17$^a$ formed with an opening 17$^b$, in which the shaft section 14$^a$ is supported, and oppositely extending shaft or axle members 17$^c$. As shown at 17$^{b\prime}$, the opening 17$^b$ may be provided with a suitable bearing sleeve. The outer ends of the axle members 17$^c$ are reduced, as shown at 17$^d$, extend through openings formed in the bearing cups 16$^a$ and are provided with screw threads to take nuts 17$^e$ by which the cups 16$^a$ may be clamped to the shoulders 17$^f$ formed by reducing the free ends of the axle members.

18 indicates a pair of gear elements, each rotatably mounted upon one of the shaft or axle members 17$^c$. Each gear element comprises a bevel gear 18$^a$ having a hub or sleeve 18$^b$, loosely fitting or surrounding the adjacent axle member 17$^c$ and a spur pinion 19 arranged to mesh with the adjacent spur gear 9$^a$ or 9$^{a\prime}$. The bevel gear 18$^a$, and sleeve 18$^b$ are connected by a web 18$^c$. The gear 18$^a$, sleeve 18$^b$, and pinion 19 may be formed integrally. The web 18$^c$ is preferably recessed to form a seat for an anti-friction load bearing 19', preferably of the annular type, arranged at the inner end of the adjacent axle member 17$^c$; while at its outer end the sleeve 18$^b$ carries the inner race of the adjacent bearing 16. By this construction it will be seen that each gear element 18 is supported by a load bearing at its inner end and a thrust bearing at its outer or opposite end.

19$^a$ indicates a bevel pinion fixed to the shaft 14$^a$ and arranged to mesh with one of the bevel gears 18$^a$ to drive it, and 19$^{a\prime}$ indicates a bevel pinion fixed to the differential gear 10$^e$ or the hub 10$^f$ thereof and meshing with the other bevel gear 18$^a$ to drive it. By preference the gear 19$^a$ is formed integrally with the shaft 14$^a$ and the pinion 19$^{a\prime}$ is formed integrally with the differential gear 10$^e$ or hub 10$^f$ therefor. The purpose of this arrangement is to simplify the construction, and insure durability and economical transmission of power. As shown in Fig. 2, the pinion 19$^a$ is arranged near the rear end of the shaft 14$^a$ and preferably provides a shoulder for the inner race of the bearing 12. The opening 11 is preferably of a size to permit the shaft 14$^a$ and pinion 19$^a$ to be inserted and removed therethrough for assembly and disassembly purposes, as will be later described. 10$^g$ indicates a collar surrounding the shaft 14$^a$ and arranged between the pinion 19$^{a\prime}$ and supporting member 17. The collar 10$^g$ is preferably formed integrally with the pinion 19$^{a\prime}$. It is of such length that it occupies substantially all the space between the pinion 19$^{a\prime}$ and the adjacent edge of the supporting member 17, so as to maintain the differential gear 10$^e$ in operative relation to the pinions. It will be noted, particularly by reference to Fig. 2, that in the illustrated construction, which is the preferred embodiment of my invention, the gears 18$^a$, 18$^a$, are similar in size to each other and the pinions 19$^a$, 19$^{a\prime}$, are similar in size to each other. The purpose of this construction is to facilitate manufacture and assembly of the mechanism, and also to provide for the transmission of the power from each differential gear to the adjacent axle section by the same number of elements and of a size corresponding respectively to those elements between the other differential gear and the axle section adjacent thereto. However, to properly support each gear 18$^a$ and its driving pinion 19$^a$ or 19$^{a\prime}$ out of contact with the other gear 18$^a$ and its driving pinion, I offset the axle members 17$^c$, relatively to each other, so that the pinions 19 engage the gears 9$^a$, 9$^{a\prime}$, at opposite sides of a vertical plane cutting the axis of the latter. And to receive the bearings 16 at the outer end of the axle members 17$^c$, the recesses formed in the supplemental standards 8$^{x\prime}$ are offset relatively to each other, as clearly shown in Fig. 5.

In operation, the propeller shaft is connected by a universal joint directly to the shaft section 14$^{a\prime}$. The section 14$^{a\prime}$ being connected to the differential casing 10$^c$, the latter is rotated and carries with it the pinions 10$^d$, and they in turn carry with them the differential gears 10$^e$, 10$^{e\prime}$, and permit relative movement thereof when necessary in the operation of the vehicle. The gear 10$^e$ is connected through the hub 10$^f$ with the pinion 19ᵃ′, whereas the gear 10ᵉ′ is connected through the hub 10ᵗ′ and shaft 14ᵃ with the pinion 19ᵃ, and these pinions in turn transmit the power to the gear elements 18, 18.

From the foregoing description it will be seen that I provide for double reduction in speed between the propeller shaft and the driven axle sections, and that these elements of this speed reduction mechanism are correlated with the differential mechanism in a relatively simple manner, so that the rear axle sections may be driven with minimum friction losses, which reduces wear upon the power transmitting elements and strain upon their supporting bearings; furthermore, I attain these results by the use of a comparatively small number of elements which require a minimum sized housing. It will also be seen that the gear 9ᵃ or 9ᵃ′, which is connected to each driven axle section, is connected thereto relatively close to the bearing which supports the axle section, and that the adjacent pinion 19 which drives the gear 9ᵃ or 9ᵃ′ is mounted on a shaft midway between the supports therefor. Accordingly, I am enabled to correlate these elements for operation in a most efficient manner.

The mechanisms within the housing 8 can be inspected, removed and replaced in a simple manner; for instance, by removing the cover 8ᵉ, the support 15 and the yoke pieces 8ᵍ, and loosening the yoke pieces 15ᵉ, the shaft section 14ᵃ with the pinion 19ᵃ can be moved endwise through the opening 11, and thereafter the supporting member 17, pinion 19 and bearings 16 can be removed as a unit, as shown in Fig. 6, and also the differential 10 and shaft section 14ᵃ′. It will therefore be seen that all of the power transmitting elements can be readily and quickly inspected and adjusted as well as removed, disassembled and assembled. This construction also permits me to assemble the gear elements 18 and the bearings therefor in co-operative relationship upon the support 17 before the assembly thereof in the housing 8.

To those skilled in the art, many alterations in construction and widely differing embodiments and applications of my invention will suggest themselves, without departing from the spirit and scope thereof. My disclosures and the description herein are purely illustrative and are not intended to be in any sense limiting.

What I claim is:

1. In apparatus of the character described, the combination of a housing, a differential mechanism and power transmitting elements, including a driven shaft, mounted in said housing, the front and rear walls of said housing being formed with aligned openings to receive bearings which support the opposite ends of said shaft, a bearing for said shaft intermediate its ends and supported by said housing and adjusting means for the rearmost bearing removably mounted in said opening in said rear wall, whereby said shaft may be removed from said housing by endwise movement upon the removal of said adjusting means and rearmost bearing.

2. The combination with a pair of driven axle sections, a shaft, a housing for said axle sections and shaft, a pair of gear elements fixed to the opposite ends of said shaft, a pair of gear elements loosely mounted on said shaft between the first pair of gear elements, a driving element having a plurality of pinions meshing with one element of each of said pairs of gears, a bearing for said shaft carried by said housing and disposed between one of said gears which is fixed and the pair of gears which is loosely mounted on said shaft, and power transmitting elements between each of the other elements of said pairs of gears and said axle sections, respectively.

3. The combination with a pair of driven axle sections, a shaft, a housing for said axle sections and shaft, a pair of gear elements fixed to the opposite ends of said shaft, a pair of gear elements loosely mounted on said shaft between the first pair of gear elements, a casing rotatable about the axis of said shaft and carrying a plurality of pinions meshing with one element of each of said pairs of gears, a bearing for said shaft carried by said housing and disposed between one of said gears which is fixed and the pair of gears which is loosely mounted on said shaft, and power transmitting elements between each of the other elements of said pairs of gears and said axle sections, respectively.

4. The combination with a pair of driven axle sections, a compound shaft comprising a driving member and a driven member, a housing for said axle sections and shaft, a pair of gear elements fixed to the opposite ends of said driven shaft member, a pair of gear elements loosely mounted on said driven shaft member between the first pair of gear elements, a casing connected to said driving shaft section and having a plurality of pinions meshing with one element of each of said pairs of gears, a bearing for said shaft carried by said housing and disposed between one of said gears which is fixed and the pair of gears which is loosely mounted on said shaft, and power transmitting elements between each of the other elements of said pairs of gears and said axle sections, respectively.

5. The combination with a pair of driven axle sections, of a driven shaft comprising two members arranged end to end, a housing for said axle sections and shaft, radially extending studs connected to and rotated by one of said members, pinions loose on said studs, differential gears mounted on axes coinciding with the axis of said driven shaft and meshing with said pinions, and speed reducing elements, one of which includes the other shaft member, between said differential gears and said driven axle sections and a bearing for said driven shaft carried by said housing and interposed between said speed reducing elements.

6. The combination with a pair of axle sections, a housing therefore, a pair of supporting members carried by said housing, speed reduction elements mounted on one of said supporting members, and a differential mechanism and speed reducing elements rotatably supported by the other of said members and operating therethrough and through said speed reduction elements to drive said axle sections.

7. The combination with a pair of axle sections, a housing, a pair of supporting members, speed reduction elements mounted on said supports, a differential mechanism rotatably mounted on one of said members and operating therethrough and through said elements to drive said axle sections, and means for removably supporting said supporting members in said housing.

8. The combination of a pair of oppositely extending gear supporting members, a rotatable element supported by each of said members, a gear secured to each element, a driven member, a support for said driven member between said gears, and a pair of pinions on said driven member and spaced from each other thereon a distance greater than the diameter of either of said gears and each meshing with one of said gears.

9. The combination of a pair of oppositely extending members, a rotatable element supported by each of said members, a bevel gear secured to each of said elements, a driven member a support for said driven member between said gears, and a pair of pinions on said driven member and spaced from each other thereon a distance greater than the diameter of either of said gears.

10. The combination of a pair of oppositely extending members, a rotatable element supported by each of said members, a gear secured to each element, a driven member, a pair of pinions on said driven member and spaced from each other thereon a distance greater than the diameter of either of said gears, said members being off-set relative to each other to support each said gear in contact with one of said pinions and a support for said driven member between said gears.

11. The combination with a pair of axle sections, of a driving member, a housing for said axle sections and driving member, a differential mechanism having a casing connected to said member, and speed reduction mechanism between said differential mechanism and said axle sections, including a shaft arranged endwise of and supported at one end by said driving member, and a bearing for said shaft arranged intermediate its ends and carried by said housing in the vertical plane of said axle sections.

12. The combination with a pair of axle sections, of a driving member, a housing for said axle sections and driving member, a differential mechanism having a casing connected to said member, and double speed reduction mechanism between said differential mechanism and said axle sections, including a shaft arranged endwise of and supported at one end by said driving member, and a bearing for said shaft arranged intermediate its ends and carried by said housing in the vertical plane of said axle sections.

13. The combination with a pair of axle sections, of a driving member, a differential mechanism having a casing connected to said member, speed reduction mechanism between said differential mechanism and said axle sections, including a shaft, means for supporting the opposite ends of said shaft, and separate means for supporting said shaft intermediate its opposite ends disposed in the vertical plane of said axle sections.

14. The combination with a pair of axle sections each provided with a gear near its inner end, of a housing, a pair of supports in said housing for the inner ends of said axle sections and disposed nearer the ends of said axle sections than said gears thereon, and differential and speed reduction mechanisms through which power is transmitted to said gears, said mechanisms including a shaft, a supporting member and pinions mounted on said supporting member arranged to mesh with said gears.

15. The combination with a pair of axle sections each provided with a gear near its inner end, of a housing, a pair of supports in said housing for the inner ends of said axle sections and disposed nearer the end of said axle sections than said gears thereon, differential and speed reduction mechanisms through which power is transmitted to said gears, said mechanisms including a shaft, a supporting member and pinions mounted on said supporting member arranged to mesh with said gears, and thrust bearings between each axle section and the adjacent support therefor.

16. The combination with a pair of axle sections each provided with a gear near its inner end, of a housing, a pair of supports in said housing for the inner ends of said axle sections and disposed nearer the end of said axle sections than said gears thereon, differential and speed reduction mechanisms through which power is transmitted to said gears, said mechanisms including a shaft, a supporting member and pinions mounted on said supporting member arranged to mesh with said gears, and separate supports in said housing for the opposite ends of said supporting member.

17. The combination with a pair of axle sections each provided with a gear near its inner end, of a housing, a pair of supports in said housing for the inner ends of said axle sections, differential and speed reduction mechanisms through which power is transmitted to said gears, said mechanisms including a shaft, a supporting member and pinions mounted on said supporting member arranged to mesh with said gears, separate supports in said housing for the opposite ends of said supporting member, and thrust bearings between the hubs of said pinions and said separate supports.

18. The combination with a pair of axle sections each provided with a gear near its inner end, of a housing, a pair of supports in said housing for the inner ends of said axle sections, differential and speed reduction mechanisms through which power is transmitted to said gears, said mechanisms including a shaft, a supporting member and pinions mounted on said supporting member arranged to mesh with said gears, separate supports in said housing between said gears and the side walls thereof for the opposite ends of said supporting member.

19. The combination with a pair of axle sections, each provided with a gear, of a differential mechanism, a supporting member disposed parallel to said axle sections, a pair of gear elements rotatably carried by said supporting member and each comprising a gear operatively connected to and driven by one of the differential gears of said differential mechanism and a pinion adapted to mesh with the gear on the adjacent axle section, and anti-friction bearings for each gear element.

20. The combination with a pair of axle sections, each provided with a gear, of a housing, a differential mechanism, a supporting member disposed parallel to said axle sections, a pair of gear elements rotatably carried by said supporting member and each comprising a gear operatively connected to and driven by one of the differential gears of said differential mechanism and a pinion adapted to mesh with the gear on the adjacent axle section, a pair of supports carried by said housing for supporting said supporting member, and anti-friction load bearings for the inner ends of said gear elements.

21. The combination with a pair of axle sections, each provided with a gear, of a housing, a differential mechanism, a supporting member disposed parallel to said axle sections, a pair of gear elements rotatably carried by said supporting member and each comprising a gear operatively connected to and driven by one of the differential gears of said differential mechanism and a pinion adapted to mesh with the gear on the adjacent axle section, a pair of supports carried by said housing for supporting said supporting member, anti-friction load bearings for the inner ends of said gear elements, and thrust bearings between the outer ends of said gear elements and said supports.

22. In power transmitting mechanism of the class described, the combination of a pair of driven axle sections, a driven gear at the inner end of each of said axle sections, a housing for said axle sections and gears, a supporting member carried by said housing and provided with a bearing disposed between said gears at an angle to said axle sections, pinions mounted on said supporting member and each in mesh with the gear on the adjacent axle section, a shaft mounted intermediate its ends in said bearing and at its rear end in said housing, reduction gearing interposed between said shaft and said pinions on the said supporting member, and differential mechanism for actuating said reduction gearing.

23. In power transmitting mechanism of the class described, the combination of an axle housing having an enlarged central section and oppositely extending reduced tubular sections, axle sections mounted in said reduced tubular sections, a driven shaft disposed in said housing at an angle to said axle sections, a bearing in said housing for the rear end of said shaft, a bearing carried by said housing and engaging said shaft intermediate its ends, double reduction gearing between said shaft and said axle sections, and differential gearing mounted in said housing for actuating said shaft and double reduction gearing.

24. In a double reduction axle for motor vehicles, the combination of a pair of axle sections, a driven shaft arranged at an angle to said axle sections, spur gears each secured to the inner end of one of said axle sections, spur pinions meshing with said spur gear, pairs of reduction bevel gears, one pair for driving each of said spur pinions, the bevel pinion of one pair of said reduction bevel gears being rigidly secured to said driven shaft and the bevel pinion of the other being loosely mounted thereon, and differential mechanism disposed on said driven shaft entirely at one side of both of said bevel pinions thereon for actuating the said shaft and said loose bevel pinion.

25. In a double reduction axle for motor vehicles, the combination of a pair of axle sections, a driven shaft arranged at an angle to said axle sections, spur gears each secured to the inner end of one of said axle sections, spur pinions meshing with said spur gear, pairs of reduction bevel gears, one pair for driving each of said spur pinions, the bevel pinion of one pair of said reduction bevel gears being rigidly secured to said driven shaft and the bevel pinion of the other being loosely mounted thereon, differential mechanism disposed on said driven shaft entirely at one side of both of said bevel pinions thereon for actuating the said shaft and said loose bevel pinion, and a support for the spur pinions and bevel gears for actuating them said support having a bearing for said driven shaft disposed between said bevel pinions on said shaft.

26. The combination in a driving axle of a housing, a pair of driven axle sections arranged end to end therein, a driving shaft disposed in a substantially horizontal plane above said driven axle sections, mounted in said housing and carrying differential mechanism, spur and bevel reduction gearing in two stages between said driving shaft and said driven axle sections including supports parallel to said axle sections for a part of said reduction gearing, whereby said driving shaft may be positioned in substantial alinement with a propeller shaft located above the plane of the driven axle sections.

27. The combination in a driving axle of a housing having an enlarged central substantially liquid-tight chamber, a pair of driven axle sections arranged end to end therein, a driving shaft and differential mechanism disposed above said axle sections, transverse gear supports disposed in said housing above said axle sections, bevel and spur speed reducing gearing in two stages interposed between said differential mechanism and said rear axle sections and including bevel gears and spur pinions mounted on said supports and spur gears each of which is secured to the inner end of one of said axle sections and operates closely adjacent to the bottom of said liquid-tight chamber.

28. The combination in a driving axle of a housing, a pair of driven axle sections arranged end to end therein, a driving shaft mounted in said housing and carrying a differential mechanism and bevel pinions, a transverse support mounted in said housing and carrying bevel gears meshing with said bevel pinions and spur pinions, and spur gears at the inner ends of said axle sections meshing with said spur pinions, the mounting of said driving shaft, differential mechanism, transverse support and gears thereon permitting insertion into and withdrawal thereof from said housing as a unit.

29. The combination in a driving axle of a housing, a pair of driven axle sections arranged end to end therein, a driving shaft mounted in said housing and carrying a differential mechanism and bevel pinions, a transverse support mounted in said housing and carrying bevel gears meshing with said bevel pinions and spur pinions, and spur gears at the inner ends of said axle sections meshing with said spur pinions, said driving shaft and differential and gears thereon, said transverse supporting element and gears thereon being assembled as a unit and inserted into and withdrawn from said housing as a unit.

30. The combination in a driving axle of a housing, a pair of driven axle sections arranged end to end therein, a driving shaft mounted in said housing and carrying a differential mechanism, and speed reduction gearing in two stages between said driving shaft and said driven axle sections, said driving shaft, differential mechanism, and the speed reduction gearing ahead of the final reducing gears on the axle sections being assembled as a unit and insertable into and withdrawable from said housing as a unit.

In testimony whereof I affix my signature.

LEO MELANOWSKI.